(12) United States Patent
Ridgway et al.

(10) Patent No.: US 7,574,940 B2
(45) Date of Patent: Aug. 18, 2009

(54) STEERING COLUMN ASSEMBLY INCLUDING ANTI-ROTATION DEVICE

(75) Inventors: Jason R. Ridgway, Bay City, MI (US);
Marvin V. Manwaring, Clio, MI (US);
William D. Cymbal, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 231 days.

(21) Appl. No.: 11/588,932

(22) Filed: Oct. 27, 2006

(65) Prior Publication Data
US 2007/0137376 A1 Jun. 21, 2007

Related U.S. Application Data

(60) Provisional application No. 60/739,609, filed on Nov. 23, 2005.

(51) Int. Cl.
*B62D 1/16* (2006.01)
(52) U.S. Cl. ............... 74/492; 74/484 R; 74/527; 70/184; 70/182; 70/183; 180/287
(58) Field of Classification Search ............ 74/492, 74/495, 484 R, 485, 526, 527, 565, 475; 180/287; 70/182–187, 188, 218; 192/70.23, 192/223
See application file for complete search history.

(56) References Cited

U.S. PATENT DOCUMENTS

| | | | |
|---|---|---|---|
| 1,396,508 A | | 11/1921 | Dunn |
| 3,566,632 A | | 3/1971 | Wall et al. |
| 4,552,000 A | * | 11/1985 | Lipschutz ............ 292/341.15 |
| 5,090,730 A | * | 2/1992 | DuRocher et al. ............ 74/493 |
| 5,148,717 A | * | 9/1992 | Yamaguchi ............ 74/493 |
| 5,437,350 A | | 8/1995 | Sallez et al. |
| 5,477,750 A | * | 12/1995 | Korzan ............ 74/579 R |
| 5,564,313 A | | 10/1996 | Hoblingre |

(Continued)

FOREIGN PATENT DOCUMENTS

DE 42 28 685 3/1994

(Continued)

OTHER PUBLICATIONS

European Search Report dated Mar. 2, 2007.

*Primary Examiner*—David M. Fenstermacher
*Assistant Examiner*—Timothy J Murphy
(74) *Attorney, Agent, or Firm*—Thomas N. Twomey (57) ABSTRACT

A steering column assembly for a motor vehicle includes a steering shaft, a support bracket rotatably receiving the steering shaft for rotatably supporting the steering shaft on the motor vehicle, and an anti-rotation device. The anti-rotation device is supported by the support bracket and is moveable between an engaged position and a disengaged position. In the engaged position, the anti-rotation device prevents rotation of the steering shaft relative to the support bracket. The anti-rotation device may be moved from the engaged position to the disengaged position to allow rotation of the steering shaft relative to the support bracket. Prior to assembly of the steering column assembly to the motor vehicle, the anti-rotation device may be moved to the engaged position to lock the steering column in a common rotational position. After assembly, the anti-rotation device may be moved to the disengaged position to allow rotation of the steering shaft.

18 Claims, 4 Drawing Sheets

U.S. PATENT DOCUMENTS

| | | | |
|---|---|---|---|
| 6,094,951 A * | 8/2000 | Cusati | 70/189 |
| 6,234,039 B1 * | 5/2001 | Garnault et al. | 74/492 |
| 7,445,241 B2 * | 11/2008 | Higashino | 74/492 |
| 2003/0159536 A1 * | 8/2003 | Bergkvist et al. | 74/492 |

FOREIGN PATENT DOCUMENTS

| | | |
|---|---|---|
| DE | 10326120 | 1/2005 |
| EP | 1 072 486 | 1/2001 |
| FR | 2 702 016 | 9/1994 |
| FR | 2 860 469 | 4/2005 |
| JP | 07 052753 | 2/1995 |

* cited by examiner

STEERING COLUMN ASSEMBLY INCLUDING ANTI-ROTATION DEVICE

CROSS-REFERENCE TO RELATED APPLICATIONS

The subject patent application claims priority to and all the benefits of U.S. Provisional Patent Application Ser. No. 60/739,609, which was filed on Nov. 23, 2005.

BACKGROUND OF THE INVENTION

1. Field of the Invention

The present invention is a steering column assembly including an anti-rotation device for use on a motor vehicle.

2. Description of Related Art

A steering column assembly for a motor vehicle generally includes a steering shaft extending along a longitudinal axis and a support bracket rotatably receiving the steering shaft for rotatably supporting the steering shaft on the motor vehicle. The motor vehicle includes a stationary mounting structure mounted to a chassis or a dash of the motor vehicle. The support bracket is mounted to the stationary mounting structure.

The steering shaft includes a lower end and an upper end and the steering shaft extends between the lower end and the upper end. The lower end of the steering shaft is coupled to an intermediate shaft of a steering system of the vehicle. A steering wheel is mounted to the upper end of the steering shaft.

The lower end of the steering shaft is keyed in a complimentary configuration to the intermediate shaft of the steering system such that the lower end and the intermediate shaft are meshed with each other when coupled. The upper end of the steering shaft is keyed and the steering wheel is keyed in a complimentary configuration to the upper end such that the upper end and the steering wheel are meshed with each other when the steering wheel is mounted to the upper end.

During assembly of the motor vehicle, the steering column assembly and the stationary mounting structure are mounted to the motor vehicle. The lower end of the steering shaft is coupled with the intermediate shaft and the steering wheel is mounted to the upper end of the steering shaft. Because the lower end of the steering shaft and the intermediate shaft are keyed, an assembly worker must rotate the lower end of the steering shaft and the intermediate shaft relative to each other to mesh the lower end and the intermediate shaft. Because the upper end of the steering shaft and the steering wheel are keyed, the assembly worker must rotate the upper end of the steering shaft and the steering wheel relative to each other to mesh the upper end and the steering wheel.

The need to rotate the lower end and the intermediate shaft relative to each other and the need to rotate the upper end and the steering wheel relative to each other is time consuming. In the mass production of motor vehicles, it is beneficial to reduce the time required to assemble motor vehicles such that labor and energy costs are reduced.

Further, the need to rotate the lower end and the intermediate shaft relative to each other and the need to rotate the upper end and the steering wheel relative to each other lead to repetitive motion by the assembly worker who is tasked with assembling the steering shaft with the intermediate shaft and the steering wheel. Repetitive motion may lead to injury and increased health care costs.

Accordingly, it would be desirable to manufacture a steering column assembly that eliminates the need to rotate the lower end and the intermediate shaft relative to each other and the need to rotate the upper end and the steering wheel relative to each other.

SUMMARY OF THE INVENTION AND ADVANTAGES

The present invention is a steering column assembly for a motor vehicle. The steering column assembly includes a steering shaft and a support bracket. The steering shaft extends along a longitudinal axis and the support bracket defines a bore rotatably receiving the steering shaft for rotatably supporting the steering shaft on the motor vehicle. The steering column assembly further includes an anti-rotation device supported by the support bracket and moveable between an engaged position preventing rotation of the steering shaft and a disengaged position allowing rotation of the steering shaft.

Accordingly, the anti-rotation device may be moved to the engaged position prior to assembly of the steering column assembly to the motor vehicle. As such, the steering column of each motor vehicle coming down an assembly line may be locked in a common rotational position. An assembly worker who couples a lower end of the steering shaft to an intermediate shaft knows the common rotational position of the lower end and need not rotate the lower end and the intermediate shaft relative to each other in search of a meshed position to mesh the lower end and the intermediate shaft.

Likewise, an assembly worker who mounts a steering wheel to the upper end of the steering shaft knows the common rotational position of the upper end and need not rotate the steering wheel and the upper end relative to each other in search of a meshed position to mesh the steering wheel and the upper end. Further, the anti-rotation device may be moved to the disengaged position for allowing the steering shaft to rotate relative to the support bracket to allow for normal operation of the steering column.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2A is a magnified view of the support bracket and the anti-rotation device of FIG. 2;

DETAILED DESCRIPTION OF THE INVENTION

Referring to the Figures, wherein like numerals indicate like or corresponding parts throughout the several views, a steering column assembly 20 for a motor vehicle is generally shown. The steering column assembly 20 includes a steering shaft 22 extending along a longitudinal axis A, a support bracket 24 supporting the steering shaft 22, and an anti-rotation device 26 supported by the support bracket 24.

The anti-rotation device 26 is moveable between an engaged position and a disengaged position. In the engaged position, the anti-rotation device 26 prevents rotation of the steering shaft 22 relative to the support bracket 24. In the disengaged position, the anti-rotation device 26 allows rotation of the shaft relative to the support bracket 24. It should be appreciated that the prevention of relative rotation by the anti-rotation device 26, as referred to herein, includes a situation where the anti-rotation device 26 severely limits the rotation of the steering shaft 22 relative to the support bracket 24, i.e. when a minor amount of "play" or "slop" exists between the steering shaft 22 and the support bracket 24. Minor amounts of "play" or "slop" may exist between the steering shaft 22 and the support bracket 24 without departing from the nature of the present invention.

Figure 1:
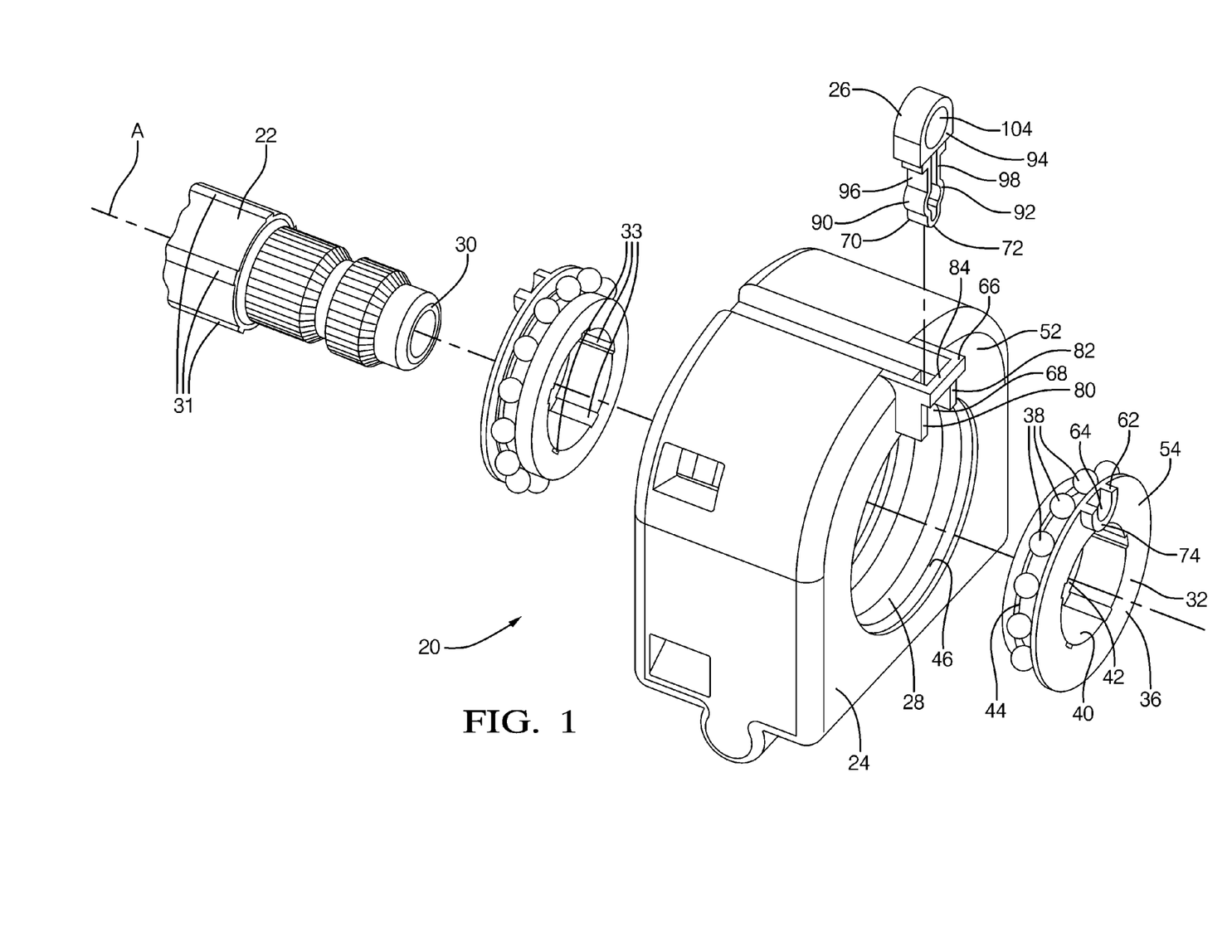
FIG. 1 is an exploded view of a first embodiment of a steering column assembly.

As shown in FIG. 1, the support bracket 24 defines a bore 28. The bore 28 rotatably receives the steering shaft 22 for rotatably supporting the steering shaft 22 on the vehicle. The support bracket 24 may be of the type disclosed in U.S. application Ser. No. 11/407453 filed on Apr. 20, 2006, which is incorporated herein by reference. Specifically, the motor vehicle may include a stationary mounting structure (not shown) mounted to, for example, a chassis (not shown) or a dash (not shown) of the motor vehicle. In such a configuration, the support bracket 24 may be mounted to the stationary mounting structure.

The steering shaft 22 includes a lower end 30 and an upper end (not shown) and the steering shaft 22 extends between the lower end 30 and the upper end. The lower end 30 of the steering shaft 22 may be coupled with an intermediate shaft (not shown) of a steering system of the vehicle. The lower end 30 may be keyed and the intermediate shaft may be keyed in a complimentary configuration to the lower end 30 such that the lower end 30 and the intermediate shaft may mesh with each other. A steering wheel (not shown) may be mounted to the upper end. The upper end may be keyed and the steering wheel may be keyed in a complimentary configuration to the upper end such that the upper end and the steering wheel may mesh with each other.

As shown in FIGS. 1-5, the steering column assembly 20 includes a coupling 32 rotatably fixed to the steering shaft 22 and coupled to the support bracket 24. The coupling 32 is rotatable relative to the support bracket 24 when the anti-rotation device 26 is in the disengaged position. In other words, when the anti-rotation device 26 is in the disengaged position, the coupling 32 is rotatable with the steering shaft 22 relative to the support bracket 24. When the anti-rotation device 26 is in the engaged position, the coupling 32 and the steering shaft 22 are incapable of rotation relative to the support bracket 24.

The coupling 32 may be a bearing. The bearing includes a race 36 and a plurality of balls 38. The race 36 presents an inner surface 40 defining a through-hole 42. The steering shaft 22 is fixed to the race 36 in the through-hole 42. As shown in FIG. 1, the race 36 defines a first annular channel 44 rotatably receiving the plurality of balls 38. The support bracket 24 defines a second annular channel 46 corresponding with the first annular channel 44 with the plurality of balls 38 rotatably disposed in the second annular channel 46. Because the race 36 is fixed relative to the steering shaft 22, the race 36 and the steering shaft 22 rotate as a unit relative to the support bracket 24. As the race 36 rotates relative to the support bracket 24, the plurality of balls 38 roll in the first and second annular channels 44, 46.

Figure 3:
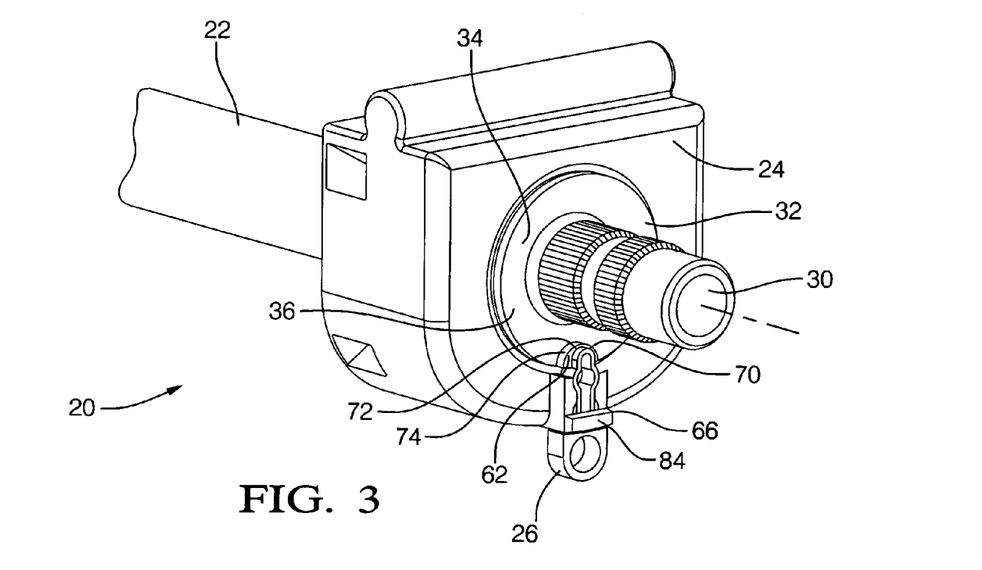
FIG. 3 is a perspective view of the first embodiment of the steering column assembly.

As shown in FIGS. 1 and 3, the lower end 30 of the steering shaft 22 may define first splines 31 and the inner surface 40 of the race 36 may define second splines 33. The second splines 33 are complimentary in configuration to the first splines 31. The second splines 33 engage the first splines 31 for rotatably fixing the steering shaft 22 and the race 36. The first splines 31 and the second splines 33 may be any size and shape. The steering shaft 22 may define any number of first splines 31 and the race 36 may define any number of second splines 33.

Figure 4:
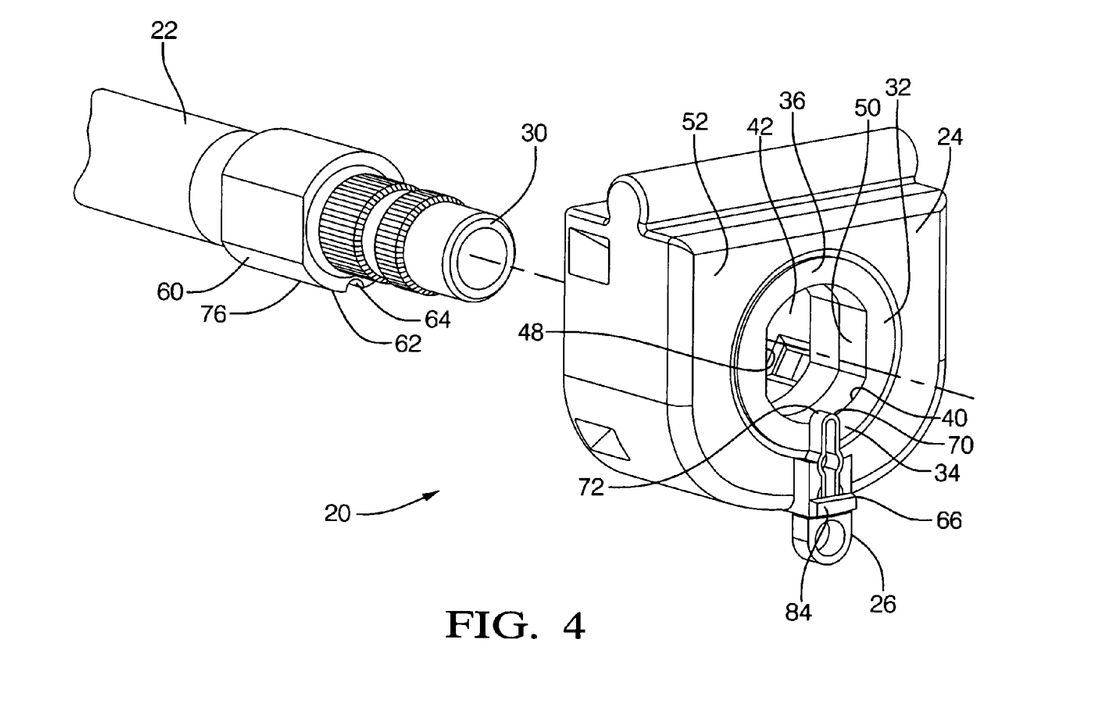
FIG. 4 is a perspective view of a second embodiment of the steering column assembly.

Alternatively, as shown in FIG. 4, the steering shaft 22 may define a first flat surface 48 and the inner surface 40 of the race 36 may define a second flat surface 50 complimentary in configuration to and engaging the first flat surface 48 for rotatably fixing the steering shaft 22 to the race 36. It should be appreciated that the steering shaft 22 may define a plurality of first flat surfaces 48 and the race 36 may define a plurality of second flat surfaces 50. For example, the steering shaft 22 may include a pair of first flat surfaces 48 and a pair of first curved surfaces each in alternating arrangement with the first flat surfaces 48. In such a configuration, the race 36 defines a pair of second flat surfaces 50 and a pair of second curved surfaces each in alternating arrangement with the second flat surfaces 50.

The steering shaft 22 may include a collar 60 extending along the longitudinal axis A in the through-hole 42 of the race 36. The collar 60 presents the first flat surface 48. In such a configuration, the collar 60 is fixed relative to the steering shaft 22 and is fixed relative to the coupling 32. The collar 60 may be fixed relative to the steering shaft 22 in any manner known to one skilled in the art. For example the collar 60 may be press fit to the steering shaft 22, overmolded with the steering shaft 22, or splined with the steering shaft 22.

As shown in FIGS. 1-5, the steering column assembly 20 includes a locking component 62 rotatably fixed relative to the steering shaft 22. The locking component 62 is defined by a notch 64 for receiving the anti-rotation device 26 in the engaged position.

The support bracket 24 includes an exterior surface 52 and a retainer 66 extending from the exterior surface 52 defining an orifice 68. The anti-rotation device 26 includes an extension 70. The anti-rotation device 26 is slideable in the orifice 68 between the engaged position and the disengaged position. The extension 70 extends through the orifice 68 and into the notch 64 of the locking component 62 in the engaged position. In the disengaged position, the extension 70 is disengaged with the notch 64.

The extension 70 may include a tip 72 complimentary in configuration to the notch 64. For example, the tip 72 of the extension 70 may be rounded and the notch 64 may be U-shaped for receiving the tip 72. Preferably, the tip 72 snugly fits into the notch 64 such that the anti-rotation device 26 prevents rotation of the steering shaft 22 relative to the support bracket 24. However, it should be appreciated a minor amount of "play" or "slop" may exist between the locking component 62 and the tip 72 of the extension 70 disposed in the locking component 62 without departing from the nature of the present invention.

Figure 2:
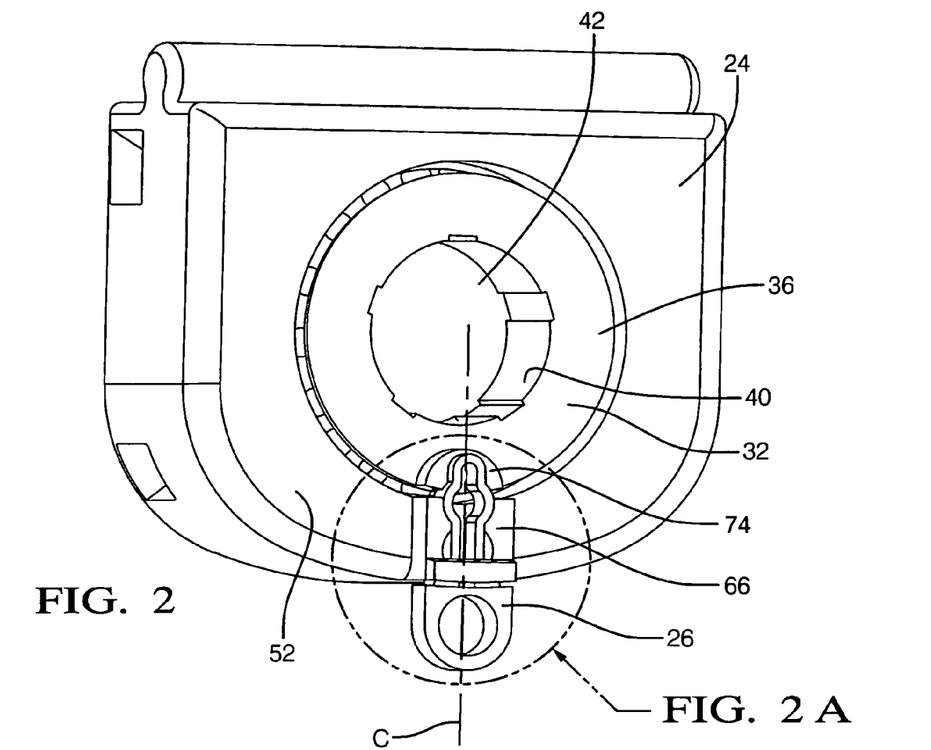
FIG. 2 is a view of a portion of the first embodiment of the steering column assembly including a support bracket, a coupling, and an anti-rotation device.

As shown in FIGS. 1-3, the locking component 62 may be further defined as a protrusion 74 extending from the coupling 32 and rotatably fixed relative to the coupling 32. Specifically, the race 36 may define the face surface 54 with the protrusion 74 extending from the face surface 54. In such a configuration, the protrusion 74 and the retainer 66 are aligned along the longitudinal axis A such that the notch 64 and the orifice 68 are aligned along the longitudinal axis A. The race 36 may be rotated relative to the support bracket 24 such that the notch 64 and the orifice 68 extend along a common axis C. In the engaged position the extension 70 of the anti-rotation device 26 extends along the common axis C into the notch 64 defined by the protrusion 74 to prevent rotation of the race 36 relative to the support bracket 24.

Alternatively, as shown in FIG. 4, locking component 62 may be defined as the collar 60. In such a configuration, the collar 60 projects beyond the race 36 and defines the notch 64. The collar 60 and the retainer 66 are aligned along the longitudinal axis A such that the notch 64 and the orifice 68 are aligned along the longitudinal axis A. The collar 60 and the race 36 may be rotated relative to the support bracket 24 such that the notch 64 and the orifice 68 extend along a common axis C. In the engaged position the extension 70 of the anti-rotation device 26 extends along the common axis C into the notch 64 defined by the collar 60 to prevent rotation of the collar 60 relative to the support bracket 24.

Figure 5:
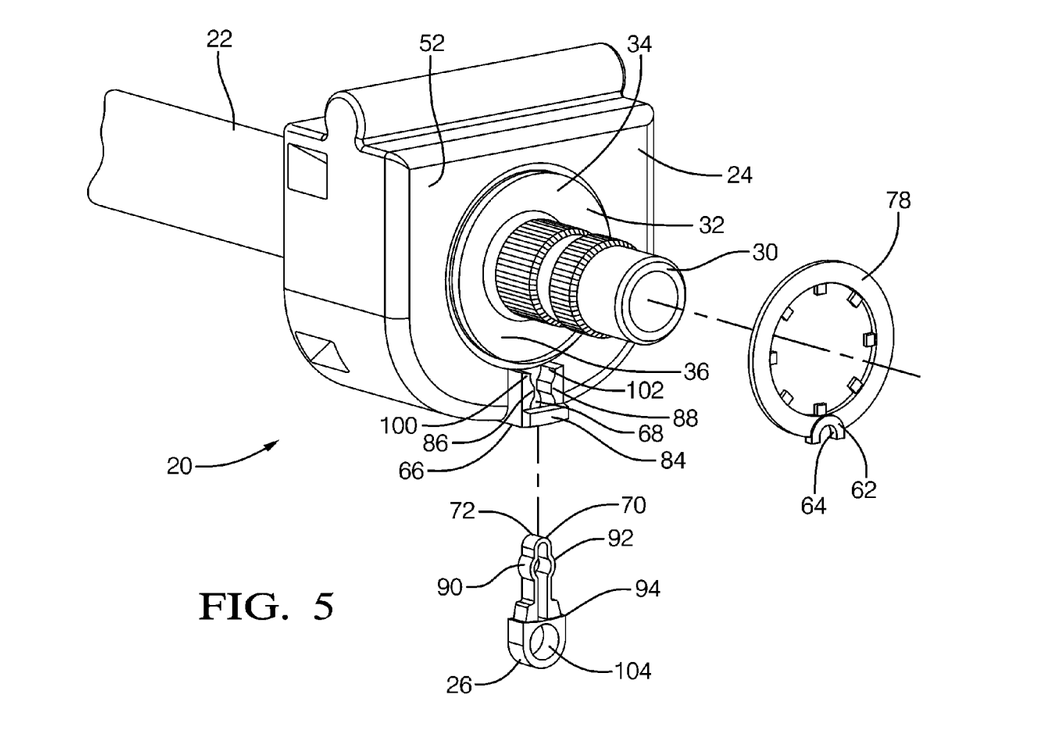
FIG. 5 is a perspective view of a third embodiment of the steering column assembly.

Alternatively, as shown in FIG. 5, the steering column assembly 20 may include a washer 78 fixed to the steering shaft 22. In such a configuration, the locking component 62 may be defined as the protrusion 74 extending from the washer 78 defining the notch 64. The washer 78 is rotationally fixed to the steering shaft 22 in any manner known to one skilled in the art. For example, the washer 78 may be press fit to the steering shaft 22 or may mechanically engage the steering shaft 22 with splines or flats. The washer 78 may be axially fixed to the steering shaft 22 along the longitudinal axis A.

The washer 78 and the retainer 66 are aligned along the longitudinal axis A such that the notch 64 and the orifice 68 are aligned along the longitudinal axis A. The washer 78 and the steering shaft 22 may be rotated relative to the support bracket 24 such that the notch 64 and the orifice 68 extend along a common axis C. In the engaged position the extension 70 of the anti-rotation device 26 extends along the common axis C into the notch 64 defined by the protrusion 74 to prevent rotation of the washer 78 relative to the support bracket 24.

The retainer 66 includes a first guide 80 extending from the exterior surface 52 and a second guide 82 spaced from the first guide 80 and extending from the exterior surface 52 with the orifice 68 defined by the exterior surface 52, the first guide 80 and the second guide 82. The retainer 66 may also include a cross-bar 84 spaced from the exterior surface 52 and extending between the first guide 80 and the second guide 82 with the orifice 68 defined by the first guide 80, the second guide 82, the exterior surface 52, and the cross-bar 84.

Preferably the anti-rotation device 26 snuggly fits in the orifice 68 of the retainer 66 such that the anti-rotation device 26 prevents rotation of the steering shaft 22 relative to the support bracket 24 when the anti-rotation device 26 is in the engaged position. However, it should be appreciated a minor amount of "play" or "slop" may exist between the anti-rotation device 26 and the retainer 66 without departing from the nature of the present invention.

The first guide 80 includes a first inside surface 56 and the second guide 82 includes a second inside surface 58 facing the first inside surface 56. The first inside surface 56 may include a first detent 86 and the second inside surface 58 may include a second detent 88 facing the first detent 86. The extension 70 may include a first boss 90 and a second boss 92. In the engaged position, the first boss 90 is disposed between the first detent 86 and the locking component 62 and the second boss 92 is disposed between the second detent 88 and the locking component 62 for locking the anti-rotation device 26 in the orifice 68. In other words, the first and second bosses 90, 92 and the first and second detents 86, 88 maintain the anti-rotation device 26 in the engaged position.

The extension 70 includes a base 94, a first leg 96 extending between the base 94 and the first detent 86, and a second leg 98 spaced from the first leg 96 and extending between the base 94 and the second detent 88. The first leg 96 flexibly urges the first detent 86 toward the first boss 90. The second leg 98 flexibly urges the second detent 88 toward the second boss 92. The first leg 96 and the second leg 98 flex when the anti-rotation device 26 is removed from the orifice 68 to allow the first boss 90 to slide by the first detent 86 and to allow the second boss 92 to slide by the second detent 88. The first detent 86 includes a first chamfer 100 and the second detent 88 includes a second chamfer 102. The first detent 86 and the second detent 88 slide along the first chamfer 100 and the second chamfer 102, respectively, as the anti-rotation device 26 is moved from the engaged position to the disengaged position.

In an alternative embodiment, the anti-rotational device may be adhesive tape. In the engaged position, the adhesive tape adhesively couples the steering shaft 22 with the support bracket 24. Specifically, such an embodiment may include the coupling 32 fixed to the steering shaft 22. In the engaged position, the adhesive tape adheres to the coupling 32 and adheres to the support bracket 24 to prevent rotation between the steering shaft 22 relative to the support bracket 24. In the disengaged position, the tape is not adhered to the coupling 32 and/or the support bracket 24 to allow rotation of the steering shaft 22 relative to the support bracket 24. More specifically, such an embodiment may include the race 36 fixed to the steering shaft 22 and the tape is adhered to the race 36 and the support bracket 24 in the engaged position and is not adhered to the race 36 and the support bracket 24 in the disengaged position.

As shown in FIGS. 1-5, the base 94 of the anti-rotation device 26 may define a cut-out 104. For example, the cut-out 104 may facilitate the movement of the anti-rotation device 26 from the engaged position to the disengaged position. For example, a user may insert a finger or a tool into the cut-out 104 and may subsequently provide the requisite force required to move the anti-rotation device 26 from the engaged position to the disengaged position.

For each embodiment of the invention, the anti-rotation device 26 may be moved to the engaged position prior to assembly of the steering column assembly 20 to the motor vehicle. The motor vehicle may be assembled on an assembly line where a plurality of steering column assemblies 20 is disposed. Prior to assembly of each steering column assembly 20 to a respective motor vehicle, the steering shaft 22 of each of the steering column assemblies 20 is preferably rotated to a common rotational position and the anti-rotation device 26 is moved to the engaged position to lock the steering column assembly 20 in the common rotational position.

As such, the steering column of each motor vehicle coming down an assembly line is in a common rotational position relative to the support bracket 24. An assembly worker who couples the lower end 30 of the steering shaft 22 to the intermediate shaft knows the common rotational position of the lower end 30 and need not rotate the lower end 30 and the intermediate shaft relative to each other in search of a meshing position to mesh the lower end 30 and the intermediate shaft.

Likewise, an assembly worker who mounts the steering wheel to the upper end of the steering shaft 22 knows the common rotational position of the upper end and need not rotate the steering wheel and the upper end relative to each other in search of a meshed position to mesh the steering wheel and the upper end.

After the lower end 30 is meshed with the intermediate shaft and the steering wheel has been mounted to the upper end, the anti-rotation device 26 may be moved to the disengaged position for allowing the steering shaft 22 to rotate relative to the support bracket 24 to allow for normal operation of the steering column. The anti-rotation device 26 may be removed from the steering column assembly 20 for reuse.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a motor vehicle, said steering column assembly comprising:
    a steering shaft extending along a longitudinal axis;
    a support bracket defining a bore rotatably receiving said steering shaft for rotatably supporting said steering shaft on the motor vehicle;
    an anti-rotation device supported by said support bracket and moveable to an engaged position only when said steering shaft is rotated to a single lockable position to lock said steering shaft in said single lockable position and moveable to a disengaged position allowing rotation of said steering shaft; and
    a locking component rotatably fixed relative to said steering shaft and defined by a notch for receiving said anti-rotation device in said engaged position;
    wherein said support bracket includes a retainer defining an orifice; and
    wherein said anti-rotation device includes an extension extending through said orifice and into said notch of said locking component in said engaged position.

2. The steering column assembly as set forth in claim 1 further including a coupling rotatably fixed to said steering shaft and coupled to said support bracket and rotatable relative to said support bracket when said anti-rotation device is in said disengaged position.

3. The steering column assembly as set forth in claim 2 wherein said coupling is further defined as a bearing with said bearing including a race presenting an inner surface defining a through-hole with said steering shaft fixed to said race in said through-hole.

4. The steering column assembly as set forth in claim 3 wherein said bearing includes a plurality of balls and said race defines a first annular channel rotatably receiving said plurality of balls.

5. The steering column assembly as set forth in claim 4 wherein said support bracket defines a second annular channel corresponding with said first annular channel with said plurality of balls rotatably disposed in said second annular channel.

6. The steering column assembly as set forth in claim 3 wherein said steering shaft defines first splines and said inner surface of said race defines second splines complimentary in configuration to and engaging said first splines for rotatably fixing said steering shaft and said race.

7. The steering column assembly as set forth in claim 3 wherein said steering shaft defines a first flat surface and wherein said inner surface of said race defines a second flat surface complimentary in configuration to and engaging said first flat surface for rotatably fixing said steering shaft to said race.

8. The steering column assembly as set forth in claim 7 wherein said steering shaft includes a collar extending along said longitudinal axis in said through-hole of said race and presenting said first flat surface.

9. The steering column assembly as set forth in claim 2 wherein said locking component is further defined as a protrusion extending from said coupling and rotatably fixed relative to said coupling.

10. The steering column assembly as set forth in claim 2 wherein said locking component is further defined as a collar fixed relative to said steering shaft and fixed relative to said coupling with said collar projecting beyond said coupling and defining said notch.

11. The steering column assembly as set forth in claim 2 further including a washer fixed to said steering shaft and wherein said locking component is further defined as a protrusion extending from said washer defining said notch.

12. The steering column assembly as set forth in claim 1 wherein said support bracket includes an exterior surface and said retainer extends from said exterior surface.

13. The steering column assembly as set forth in claim 12 wherein said extension includes a tip complimentary in configuration to said notch.

14. The steering column assembly as set forth in claim 12 wherein said retainer includes a first guide extending from said exterior surface and a second guide spaced from said first guide and extending from said exterior surface with said orifice defined by said exterior surface and said first guide and said second guide.

15. The steering column assembly as set forth in claim 14 wherein said first guide includes a first inside surface having a first detent and said second guide includes a second inside surface facing said first inside surface and having a second detent facing said first detent.

16. The steering column assembly as set forth in claim 15 wherein said extension includes a first boss and a second boss with said first boss disposed between said first detent and said locking component and with said second boss disposed between said second detent and said locking component for locking said anti-rotation device in said orifice.

17. The steering column assembly as set forth in claim 16 wherein said extension includes a base, a first leg extending between said base and said first detent flexibly urging said first detent toward said first boss, and a second leg spaced from said first leg and extending between said base and said second detent flexibly urging said second detent toward said boss such that said first leg and said second leg flex when said anti-rotation device is removed from said orifice to allow said first boss to slide by said first detent and to allow said second boss to slide by said second detent.

18. A steering column assembly for a motor vehicle, said steering column assembly comprising:
    a steering shaft extending along a longitudinal axis;
    a support bracket defining a bore rotatably receiving said steering shaft for rotatably supporting said steering shaft on the motor vehicle;
    an anti-rotation device supported by said support bracket and moveable between an engaged position preventing rotation of said steering shaft and a disengaged position allowing rotation of said steering shaft;
    a coupling rotatably fixed to said steering shaft and coupled to said support bracket and rotatable relative to said support bracket when said anti-rotation device is in said disengaged position; and
    a locking component rotatably fixed relative to said steering shaft and defined by a notch for receiving said anti-rotation device in said engaged position;

wherein said support bracket includes an exterior surface and a retainer extending from said exterior surface defining an orifice;

wherein said retainer includes a first guide extending from said exterior surface and a second guide spaced from said first guide and extending from said exterior surface with said orifice defined by said exterior surface and said first guide and said second guide;

wherein said first guide includes a first inside surface having a first detent and said second guide includes a second inside surface facing said first inside surface and having a second detent facing said first detent;

wherein said extension includes a first boss and a second boss with said first boss disposed between said first detent and said locking component and with said second boss disposed between said second detent and said locking component for locking said anti-rotation device in said orifice; and wherein said extension includes a base, a first leg extending between said base and said first detent flexibly urging said first detent toward said first boss, and a second leg spaced from said first leg and extending between said base and said second detent flexibly urging said second detent toward said boss such that said first leg and said second leg flex when said anti-rotation device is removed from said orifice to allow said first boss to slide by said first detent and to allow said second boss to slide by said second detent.

\* \* \* \* \*